F. J. CROSS.
FOCUSING MECHANISM FOR CAMERAS.
APPLICATION FILED APR. 19, 1918.
1,275,858.
Patented Aug. 13, 1918.
2 SHEETS—SHEET 1.
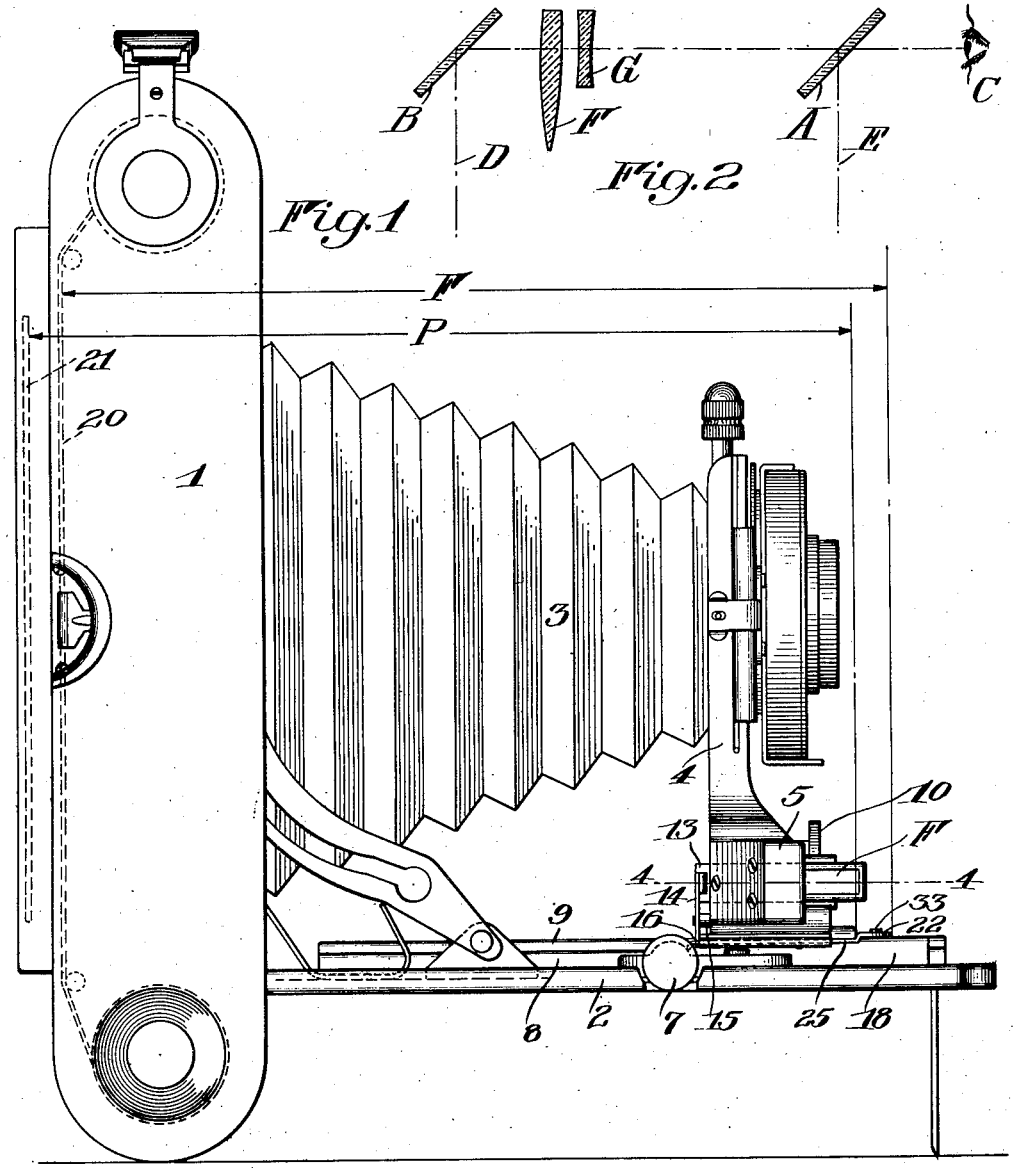
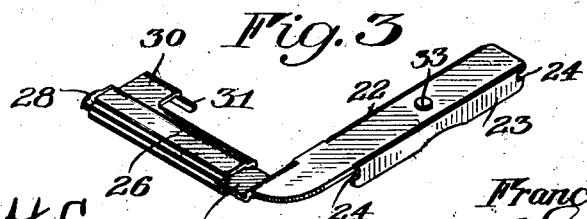
WITNESSES:
INVENTOR.
Francis J. Cross
BY
his ATTORNEYS.

F. J. CROSS.
FOCUSING MECHANISM FOR CAMERAS.
APPLICATION FILED APR. 19, 1918.

1,275,858.

Patented Aug. 13, 1918.
2 SHEETS—SHEET 2.

WITNESSES:

INVENTOR.
Francis J. Cross
BY
his ATTORNEYS.

UNITED STATES PATENT OFFICE.

FRANCIS JAMES CROSS, OF CHARLTON, ENGLAND, ASSIGNOR TO EASTMAN KODAK COMPANY, OF ROCHESTER, NEW YORK, A CORPORATION OF NEW YORK.

FOCUSING MECHANISM FOR CAMERAS.

1,275,858.   Specification of Letters Patent.   Patented Aug. 13, 1918.

Application filed April 19, 1918. Serial No. 229,478.

*To all whom it may concern:*

Be it known that I, FRANCIS J. CROSS, of Charlton, Kent, England, have invented certain new and useful Improvements in Focusing Mechanisms for Cameras; and I do hereby declare the following to be a full, clear, and exact description of the same, reference being had to the accompanying drawings, forming a part of this specification, and to the reference-numerals marked thereon.

My present invention relates to photography and more particularly to cameras of the type provided with optical means for finding the distance of the object to be photographed and automatically translating this reckoning into correction of the lens position whereby the lens and lens carriage are brought to the proper focused position. In some such cameras, provision is made for the use of either plates or films, selectively, but the arrangements are such that one is supported in a plane removed from the plane of the other. It is the object of the invention to provide stop devices of an auxiliary nature for both a lens carriage and a distance finding device when so associated, which can readily be applied to correct the positioning of both of these elements while exposing in one focal plane when the camera is otherwise equipped to position the elements for exposing in the other focal plane. It is a further object of the invention to combine both stops in one device or attachment that may be easily applied and removed and which will be simple and inexpensive. To these and other ends the invention resides in certain improvements and combinations of parts, all as will be hereinafter more fully described, the novel features being pointed out in the claims at the end of the specification.

In the drawings:

Figure 1 is a side view of a plate and film camera provided with focusing stops constructed in accordance with and illustrating one embodiment of my invention;

Fig. 2 is a diagrammatic view illustrative of certain optical principles involved;

Fig. 3 is a perspective view of the focusing stop attachment;

Similar reference numerals throughout the several views indicate the same parts.

Referring to Fig. 2, we will first briefly explain the optics of the telemetric features of the invention. A and B represent two substantially parallel mirrors or reflectors arranged to reflect separate rays of light from the same object toward a common viewpoint C, the degree of separation of the mirrors providing a base line. Assuming that the object is at an infinite distance, the rays of light D, E will be parallel, and will register at the point C. If, however, the object is appreciably near, one of the rays will be angular to the other. Assuming that E is the direct ray, and D the angular ray, the angle of incidence will be greater at the mirror A than at the mirror B, and there will be a lack of register in the image at C. There are therefore interposed in the path of the ray D, preferably after reflection, a pair of complementary lenses F and G of the same focal length, the former being a positive and the latter a negative lens. When these lenses are in axial register, they do not deflect the ray D, and this is their position when the object is at infinity. If one lens is moved relatively to the other, however, in its own plane, so that their axes no longer coincide, the ray D is bent or deflected in proportion to the degree of such movement, and in this way the relatively angular ray D from a near object, incident at A, may be redirected to approach C parallel with the ray E, and hence produce a two-part image at the viewpoint C with the components in register. In the present instance, F is the movable lens, and its movement is controlled by the movement of the lens carriage or focusing element of the camera, so that when the rays D and E are in register at C, the camera carriage is at a proper point to focus the camera lens on the object, without recourse to a scale or any observation other than that of the two-part image appearing at C. When the object is at infinity, the lenses F, G will be undisturbed by the camera carriage and remain in axial coincidence. Of course, the focal lengths of the lenses F and G must be coördinated to the focal length of the camera lens with reference to the base line A, B.

Figure 7:
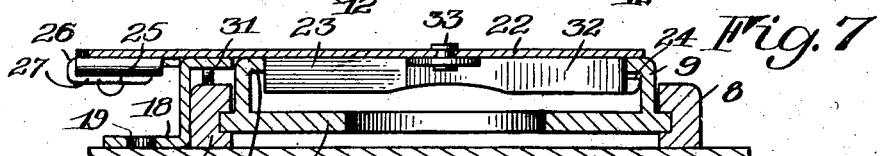
Fig. 7 is a section on the line 7—7 of Fig. 6.

The camera of the present embodiment is of the usual folding type, comprising a body 1, bed 2, bellows 3 and lens front 4, the latter mounted on a carriage 5. Movable on the bed 2 (Fig. 7) is an extension bed 6 operable by a knob 7 through the usual rack and pinion connection, not shown, and slidable in tracks 8 on the main bed. The extension bed in turn is provided with tracks 9 upon which slides the carriage block or front base 5, the latter being preferably formed of a one-piece casting. A link device 10, the specific action of which is not important to this invention, is provided on the carriage to serve as a handle and also as a means for locking the carriage to the extension bed 6. When the camera is extended for use, the carriage is pulled out until it abuts and is halted by a stop bar 11 spanning the extension bed, the abutting surfaces of said bar being in the present form of upwardly turned flanges 12 and not until then are the parts ready for focusing which is accomplished, as before indicated, by projecting the extension bed through the medium of the knob 7. It will be understood that the camera is now being generally described without reference to the stop attachment provided by the present invention, the presence of which in the drawings, will be later explained.

Figure 4:
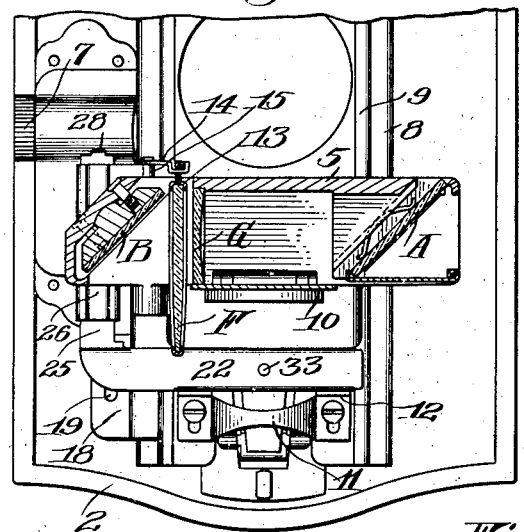
Fig. 4 is an enlarged fragmentary section taken horizontally through the camera carriage on the line 4—4 of Fig. 1 with the extension bed in normal position.
Figure 5:
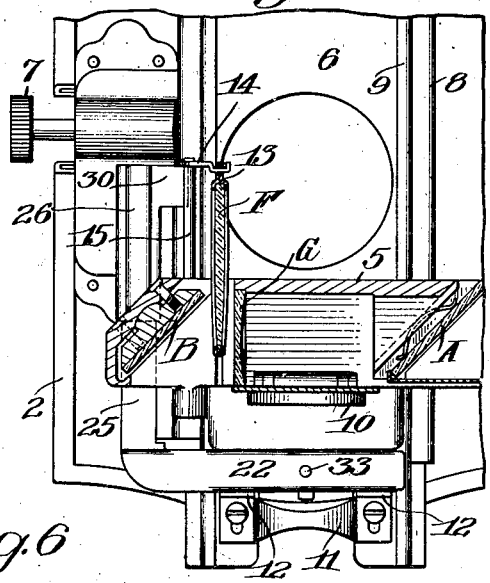
Fig. 5 is a similar view with the extension bed extended.

The optical elements of the distance finding device that have previously been explained on the diagrammatic view will be readily identified in the representations of physical structure in the other views as they have been given the same reference characters. They are all mounted on the carriage 5 and the movable lens F is carried in a frame 13 having an arm 14 extended therefrom and secured to a guide rod 15 slidable forwardly and rearwardly in a suitable guide or bore in the carriage block. A spring (not shown) located within the guide holds the rod 15 normally retracted and the lens F in the neutral position of Figs. 2 and 4 for focus of the camera lens at infinity. At the time the camera lens is halted by the stop bar 11, a finger 16 on the arm 14 is adapted to come into engagement with a stop 17 (Fig. 6) fixed to the main bed 2 and paralleling one of the tracks 9 of the extension bed 6. This stop is shown in the present instance as constituted by a flanged plate 18 adjustably secured to the main bed at 19. Thereafter, as the carriage is projected farther for focusing through the projection of the extension bed 6, the lens F is held stationary on the main bed and moves relatively to the other optical elements that proceed with the carriage in its forward movement. Thus, the reading of the distance finder, as explained on Fig. 2, indicates whether or not the carriage and camera lens have arrived at the proper focusing point.

In Fig. 1, I have roughly indicated in dotted lines the positions in which a film 20 and a plate 21 are supported at the rear of the camera, these being approximately the usual relative positions in cameras of this kind. It will be seen that they occupy different focal planes parallel to each other but with the plate 21 farther to the rear than the film 20. Therefore the distance F from the carriage stop 11 to the film 20 is the focal distance for which the camera lens is calculated as well as the stop 17 for the lens F. With the adjustments provided, therefore, the plate 21 would not be in focus and the readings of the distance finder would not be accurate.

Figure 6:
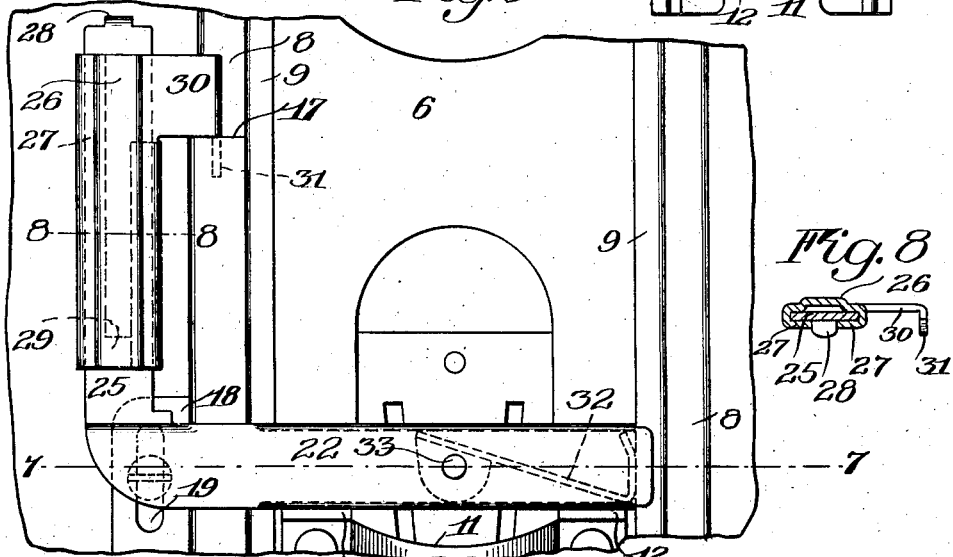
Fig. 6 is an enlarged fragmentary plan view of portions of the main bed and extension bed showing the application of the stop attachment thereto.
Figure 8:
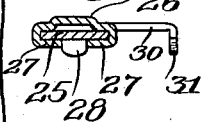
Fig. 8 is a section on the line 8—8 of Fig. 6.

In the practice of my invention, I provide an attachment which adapts the readings of the distance finder in its influence upon the focusing position of the carriage and camera lens to the rearwardly offset plate 21 and this attachment is shown alone in Fig. 3. It consists of a sheet metal bar 22 having downwardly turned flanges 23 at front and back notched at their ends as indicated at 24. A relatively angular offset arm 25 extending from one end of the bar acts as a guide for a metal slide 26 having flanges 27 crimped beneath it (Figs. 6 and 8). When this slide 26 is extended from the arm 25 to an extreme position, a lug 28 on the latter passes between the flanges 27 and is limited by a lug 29 at the end of one of them, as shown in dotted lines in Fig. 6 to prevent the total disengagement of the slide. The latter has a lateral extension 30 provided with a forwardly extending offset finger 31 which hooks beneath the stop flange 17 as shown in Fig. 6, when the attachment is applied to the camera bed. When so applied, the bar 22 extends transversely between the tracks 9 of the extension bed and is held in place by the notches 24 engaging said tracks in conjunction with a leaf spring 32 shown in dotted lines in Fig. 6 that frictionally engages one of the tracks and is riveted to the bar 22 at 33. Of course, the notches 24 must have some lost motion on the tracks 9 to permit the bar to be applied but this is taken up by the spring 32.

Thus, the bar 22 is interposed in rear of the stop bar 11 for the lens carriage and between said stop and the carriage and the extension 30 of the slide 22 is similarly interposed between the finger 16 on the lens F and its stop 17 so that these two elements 22 and 30 constitute detachable advance stops which, when applied, halt the carriage at a rearward point sufficient to focus the camera lens on the focal plane of plate 21 and to halt the lens F of the optical system at a correspondingly early point. Obviously, the stops 22 and 30 are of equal widths with each other and with the distance of separation of the focal planes 20 and 21. Therefore, in Fig. 1, the distance from plate 21 to the advance stopping point defined by the bar 22 and represented by P in said figure is equal to the distance F previously described.

I claim as my invention:

1. In the focusing mechanism of a camera, the combination with means for supporting plates and films in different focal planes in the camera, a bed, a lens carriage movable thereon and a stop on the bed for limiting outward movement of the carriage when the lens is focused on one of said planes, of a detachable advance stop adapted to be interposed between the abutting faces of the first mentioned stop and the carriage to halt the lens in focus on the other plane.

2. In the focusing mechanism of a camera, the combination with means for supporting plates and films in different focal planes in the camera, a bed having tracks thereon, a lens carriage movable on the tracks, and a stop on the bed between the tracks for limiting outward movement of the carriage when the lens is focused on one of said planes, of an advance stop adapted to be applied to the tracks between the first mentioned stop and the carriage to halt the lens in focus on the other plane.

3. In the focusing mechanism of a camera, the combination with means for supporting plates and films in different focal planes in the camera, a bed having tracks thereon, a lens carriage movable on the tracks, and a stop on the bed between the tracks for limiting outward movement of the carriage when the lens is focused on one of said planes, of an advance stop embodying a bar having notched ends adapted to be applied to the tracks between the first mentioned stop and the carriage to halt the lens in focus on the other plane, and a spring finger for holding the bar in position.

4. In the focusing mechanism of a camera, the combination with means for supporting plates and films in different focal planes in the camera, a bed, and a lens carriage movable on the latter, of optical elements on the carriage, one of which is movable relatively to the other and to the carriage to determine the distance of an object to be photographed, a stop on the bed adapted to detain the movable optical element as the carriage is moved to certain positions relatively to the bed in focus on one focal plane and an advance stop adapted to be applied in the path of said movable element to detain the latter as the carriage is moved to other positions in focus on the other focal plane.

5. In the focusing mechanism of a camera, the combination with means for supporting plates and films in different focal planes in the camera, a main bed, an extension bed and a lens carriage movable on the latter, of optical elements on the carriage one of which is movable relatively to the other and to the carriage to determine the distance of an object to be photographed, a stop on the extension bed for limiting outward movement of the carriage when the lens is focused on one of said planes, a stop on the main bed adapted to detain the movable optical element as the carriage is moved relatively to the main bed, and advance stops slidably mounted upon each other and adapted to be interposed, respectively, between the first mentioned stops and their engaging elements when the lens is focused on the other focal plane.

6. In the focusing mechanism of a camera, the combination with means for supporting plates and films in different focal planes in the camera, a main bed, an extension bed and a lens carriage movable on the latter, of optical elements on the carriage one of which is movable relatively to the other and to the carriage to determine the distance of an object to be photographed, a stop on the extension bed for limiting outward movement of the carriage when the lens is focused on one of said planes, a stop on the main bed adapted to detain the movable optical element as the carriage is moved relatively to the main bed, and advance stops slidably mounted upon each other and adapted to be interposed, respectively, between the first mentioned stops and their engaging elements when the lens is focused on the other focal plane, said stops comprising, respectively, a transverse bar carried by the extension bed and having an arm extending longitudinally of the latter, and a slide mounted on the arm.

7. A stop attachment for cameras comprising a bar having down-turned flanges notched at each end to engage the tracks of a camera bed.

8. A stop attachment for film and plate cameras comprising a carriage stop bar adapted to fit between the tracks of a camera bed and having an angular arm adapted to extend parallel with one track and a second stop member slidable on said arm.

FRANCIS JAMES CROSS.

Witnesses:
  W. J. WILLIAMS,
  WM. COYLE.